(12) United States Patent
Harris

(10) Patent No.: US 9,100,055 B2
(45) Date of Patent: Aug. 4, 2015

(54) DIGITAL IF DISTRIBUTION NETWORKS FOR RADIO COMMUNICATIONS

(75) Inventor: Philip J. Harris, Reading (GB)

(73) Assignee: Thales Holding UK PLC, Surrey (GB)

( * ) Notice: Subject to any disclaimer, the term of this patent is extended or adjusted under 35 U.S.C. 154(b) by 539 days.

(21) Appl. No.: 12/628,113

(22) Filed: Nov. 30, 2009

(65) Prior Publication Data

US 2010/0202557 A1 Aug. 12, 2010

(30) Foreign Application Priority Data

Feb. 10, 2009 (GB) .................................. 0902182.5

(51) Int. Cl.
H04B 1/00 (2006.01)

(52) U.S. Cl.
CPC ............ *H04B 1/0007* (2013.01); *H04B 1/0075* (2013.01)

(58) Field of Classification Search
CPC .... H04B 1/0007; H04B 1/005; H04B 1/0075; H04B 1/38; H04B 1/3827; H04B 1/3877; H04L 25/00; H04L 25/02; H04L 25/026
USPC ......... 375/219, 222, 259, 268, 271, 295–300, 375/302, 316, 320, 322, 344, 345; 329/304, 329/315, 347, 348; 332/103, 119, 126, 149, 332/151; 455/39, 42, 500, 73, 75, 78–80, 455/84, 88
See application file for complete search history.

(56) References Cited

U.S. PATENT DOCUMENTS

| | | | |
|---|---|---|---|
| 2,061,736 | A | 11/1936 | Mclennan |
| 6,433,739 | B1 * | 8/2002 | Soliman ......................... 342/387 |
| 2004/0190475 | A1 * | 9/2004 | Hamalainen et al. ......... 370/335 |
| 2006/0143661 | A1 | 6/2006 | Funderburk et al. |
| 2007/0218845 | A1 * | 9/2007 | Efland et al. .................... 455/84 |
| 2007/0224954 | A1 | 9/2007 | Gopi |
| 2009/0207936 | A1 * | 8/2009 | Behzad ......................... 375/296 |
| 2010/0048202 | A1 * | 2/2010 | Beacham et al. ............. 455/431 |

FOREIGN PATENT DOCUMENTS

| | | |
|---|---|---|
| EP | 2200192 A1 | 6/2010 |
| EP | 2226954 A1 | 9/2010 |
| EP | 2294723 A2 | 3/2011 |
| GB | 2 424 146 A | 9/2006 |
| WO | WO 03/047130 | 6/2003 |
| WO | WO 2006/026016 A1 | 9/2006 |

OTHER PUBLICATIONS

Patents Act 1977 Examination Report under Section 18 (3), Jan. 13, 2015, Newport, South Wales NP10 8QQ.

* cited by examiner

*Primary Examiner* — Young T Tse
(74) *Attorney, Agent, or Firm* — LaRiviere, Grubman PC

(57) ABSTRACT

A radio apparatus comprising: a radio frequency processing module for converting radio frequency signals from an antenna to intermediate frequency signals; an intermediate frequency processing module located remotely from the radio frequency processing module, for receiving intermediate frequency signals and processing said signals according to at least one communications protocol; and a digital data link for connecting the radio frequency processing module and the intermediate frequency processing module, for transfer of the intermediate frequency signals.

31 Claims, 5 Drawing Sheets

| System | Operating Frequency | Bandwidth |
|---|---|---|
| HF | 2-30 MHz | 28 MHz |
| VHF | 118-137 MHz | 19 MHz |
| Proposed L-band (Reuse of DME spectrum) | 960-1024 MHz | <64 MHz |
| Inmarsat Aero and Swift | Receive 1530-1559 MHz | 29 MHz |
|  | Transmit 1626-1660 MHz | 34 MHz |
| Thuraya | Receive 1525-1559 MHz | 34 MHz |
|  | Transmit 1626-1660 MHz | 34 MHz |
| Iridium | 1610-1626 MHz | 16 MHz |
| GlobalStar | Receive 2483-2500 MHz | 17 MHz |
|  | Transmit 1610-1626 MHz | 16 MHz |
| Proposed C-band (Reuse of MLS spectrum) | 5091-5150 MHz | <60 MHz |

Prior Art

Figure 1

DIGITAL IF DISTRIBUTION NETWORKS FOR RADIO COMMUNICATIONS

PRIORITY CLAIM

This application claims priority to United Kingdom Patent Application Number 0902182.5, Digital Distribution Network for Radio Communications, filed Feb. 10, 2009.

FIELD OF THE INVENTION

The present invention relates to apparatus and methods for radio communications, which may include SDR (software defined radio) technology.

BACKGROUND OF THE INVENTION

Radio installations in aircraft are required to simultaneously process many different radio standards, relating to many different frequency bands and modulation types. FIG. 1 shows a table, listing the main radio bands in present use for civil aviation and the bands proposed for future use, together with the operating frequency ranges for each and the bandwidths in use for each. These radio bands include the HF band at 2-30 MHz, VHF at 118-137 MHz, and various bands above 1 GHz such as those used by the Inmarsat, Thuraya, Iridium and GlobalStar systems. Proposed new bands are the L-band at 960-1024 MHz, and the C-band at 5091-5150 MHz.

Due to the considerable diversity of operating frequency and modulation type, aircraft radio installations typically include multiple types of radio equipment, with each radio standard serviced by dedicated equipment, including duplicates for redundancy. Almost all of the radio equipment is installed at a single location in the aircraft. The result is a significant cost in weight, physical volume, and power consumption.

These factors are driving the industry to adopt software defined radio (SDR) technology as a means to increase the level of integration and functionality while reducing the size and weight of the radio installation. Software Defined Radio (SDR) is a radio communication system where components that have traditionally been implemented in hardware, such as mixers, filters, amplifiers, modulators/demodulators, detectors, etc., are instead implemented using software on a computer.

SUMMARY OF THE INVENTION

The present invention enables improvements to Software Defined Radio (SDR) systems and methods. Some embodiments of the invention particularly relate to the use of SDR on aircraft, although the invention is not limited to this purpose. For example, embodiments could also be used in other forms of transportation, e.g. ships, spacecraft, land based vehicles, or used in fixed radio installations, such as remotely located radio stations, which may have restricted physical space and power availability.

A first aspect of the present invention provides a radio apparatus and corresponding method, the apparatus comprising: a radio frequency processing module for converting radio frequency signals from an antenna to intermediate frequency signals; an intermediate frequency processing module located remotely from the radio frequency processing module, for receiving intermediate frequency signals and processing said signals according to at least one communications protocol; and a digital data link for connecting the radio frequency processing module and the intermediate frequency processing module, for transfer of the intermediate frequency signals.

A further aspect of the invention provides a radio apparatus and corresponding method, the apparatus comprising: a radio frequency processing module for converting intermediate frequency signals to radio frequency signals and sending the radio frequency signals to an antenna; an intermediate frequency processing module located remotely from the radio frequency processing module, for generating intermediate frequency signals according to at least one communications protocol; and a digital data link for connecting the radio frequency processing module and the intermediate frequency processing module, for transfer of the intermediate frequency signals to the radio frequency processing module.

The intermediate frequency processing module may be a common processing module, configured for processing intermediate frequency signals having a plurality of different radio communications protocols, or according to a plurality of different standards. The intermediate frequency processing module may comprise a computer configured with software defined radio technology.

The radio frequency processing module may comprise a dedicated radio frequency (RF) "front end", and it may be remotely located. The radio frequency processing module may be configured to be connectable to a plurality of different antennas, and to convert radio frequency signals received at each antenna to intermediate frequency signals. The radio apparatus may include at least one further radio frequency processing module which is connected to the intermediate frequency processing module using the digital data link or using a further digital data link.

The digital data link may be a high speed serial link. The digital data link is preferably configured to carry data having a bandwidth of at least 65 MHz. The digital data link may be a single link or a network of links. It may include an electrical link, an optical link, or some other type of link. Another option is the use of a wireless link (such as WiMax), although this may not be acceptable in many civil aviation situations, due to current legal and safety regulations. Preferably, the digital data link is standardised to be suitable for use in a plurality of radio systems. The intermediate frequency signal may be generated as a common baseband frequency, for a number of different radio frequency standards.

The radio apparatus may include one or more network switches, and it may include one or more multiplexers. These may be used for implementing at least one of failover and load balancing functions.

The intermediate frequency processing module and the radio frequency processing module may be configured for sending and receiving control information via the digital data link, relating to at least one of tuning, power control and calibration.

The digital data link may be a single link or a network of links, and may be high-speed serial digital buses for the distribution of digitised samples of intermediate frequency (IF) radio signals. The digital data links may use at least one of ASIC and FPGA technology. The digital data link may be a WiMax link.

Embodiments of the invention use a digital data link or network to allow radio frequency (RF) circuitry to be located remotely from the intermediate frequency (IF) and protocol processing circuitry, regardless of the radio standard under consideration. The use of the radio frequency processing unit or units, the digital data link and the intermediate frequency processing units allows a reduction in the physical volume, weight, and power consumption of the radio equipment housed in the equipment bay, while allowing the RF functionality to be placed more flexibility. In particular, embodiments of the invention allow the RF functionality to be placed at, or very close to, the radio antennas themselves. This can have particular advantage for high frequency communications, such as satellite communications systems, where the losses associated in transmitting RF signals between the equipment bay and the antenna may degrade system performance. Some embodiments provide an aircraft radio system in which radio signal processing is distributed over different areas of the aircraft, for example, including next to the antenna installation, and also in a remote area under the floor of the aircraft, or in the pilot's cabin.

In some embodiments, the separation between the RF front end and the IF processing circuitry may be over 5 m. In other embodiments, it may be in the range of 2 m-5 m, or 1 m-2 m, or even a separation under 1 m in some embodiments.

The digital data network in some embodiments relies on the observation that the bandwidth of data to be carried in individual bands, for all existing and proposed radio standards for civil aviation, is less than 65 MHz, as shown in FIG. 1. This makes feasible the digitisation of an entire frequency band or sub-band and its subsequent transmission over a high-speed serial digital data link. Furthermore, the relatively low variation in radio system bandwidth of 19 to 65 MHz, as shown in FIG. 1, enables a digital data link to be standardised for use in all radio systems under consideration.

Implementation requires the adoption of a suitable media to carry the digital data, and the related electronic circuitry to support transfer of the digital data across this link.

The digital link needs to be able to transfer data at rates around 3.2 Gbps or higher, however this is within the capabilities of existing technology. Additionally the processing circuitry must be able to handle a serial data link and the related signaling protocol at these same speeds. This is within the capabilities of existing ASIC (application-specific integrated circuit) and FPGA (field-programmable gate array) technology.

A signaling protocol needs to be implemented to transfer synchronisation and control information over the link, in addition to the digitised signal samples.

The modes used may include voice, facsimile, television, and many types of data signal.

Embodiments of the invention thus enable a flexible deployment of software defined radio (SDR) technology, which may be used in an aircraft or elsewhere.

BRIEF LIST OF THE DRAWINGS

Embodiments of the present invention will now be described, by way of example only, with reference to the accompanying drawings, in which:

FIG. 1 is a table showing characteristics of existing and proposed radio bands for civil aviation;

DETAILED DESCRIPTION

Figure 2:
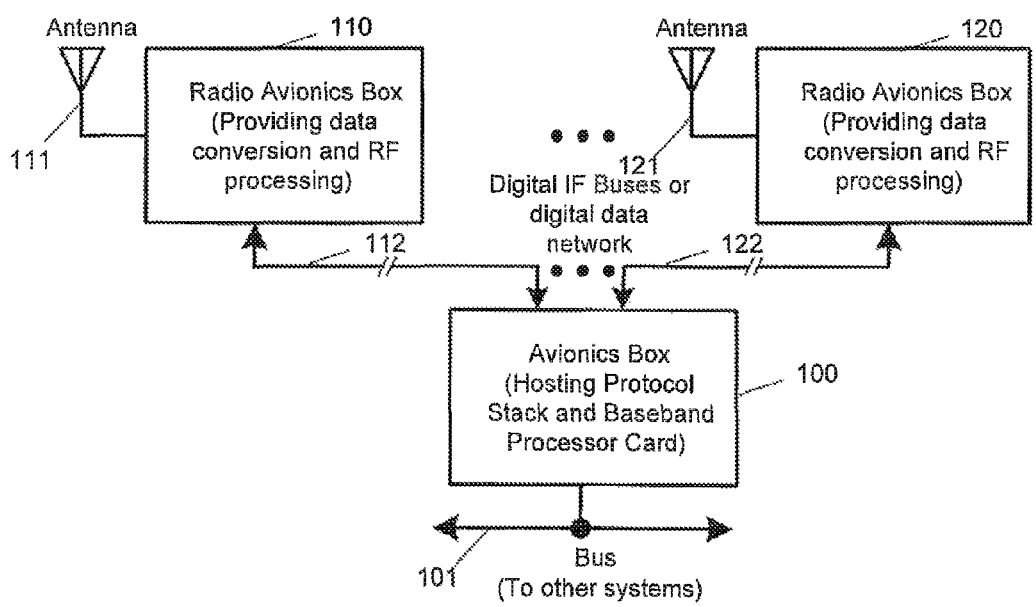
FIG. 2 is a block diagram showing a physical architecture of a radio installation according to an embodiment of the invention.

A first embodiment of the invention is shown in FIG. 2. The system includes a first radio avionics box 110, which is configured for RF processing and data conversion on a first radio frequency band, and a second radio avionics box 120, configured for RF processing and data conversion on a second radio frequency band. A first antenna 111 is connected to the first radio avionics box 110, and a second antenna 121 is connected to the second radio avionics box 120. A first digital IF bus 112 connects the first radio avionics box 110 to a baseband avionics box 100. A second digital IF bus 122 connects the second radio avionics box 120 to the baseband avionics box 100. The baseband avionics box 100 hosts a protocol stack, and includes a baseband processor card. This enables received intermediate frequency signals to be processed according to the radio standard which they are using. The baseband avionics box 100 may be connected to an AFDX bus (Avionics Full Duplex Switched Ethernet) or similar digital interface, which may be connected to other systems in the aircraft.

In other embodiments, additional radio avionics boxes may be provided, each with an antenna and a digital IF bus connecting to the baseband avionics box 100. This possibility is represented in FIG. 2 by the dots shown between the first and the second radio avionics boxes. In yet other embodiments, only a single radio avionics box may be provided, with a digital IF bus connecting it to the baseband avionics box 100, instead of the two shown in FIG. 2.

When a radio signal is received at the first antenna 111, the first radio avionics box 110 digitises the received radio signal, and converts it to an IF band. The digitised IF data is then transmitted over the high speed digital serial interface 112 to the baseband processor circuitry 100, which applies signal processing algorithms in order to extract the required information from the sampled data.

In this embodiment, signals received from the two radio frequency processing modules can be sent to the intermediate frequency processing module at the same time for processing.

When a radio signal is to be transmitted, the baseband processor circuitry 100 computes the digital samples representing the signal to be transmitted. This sampled data is then sent over the serial interface to the radio frequency circuitry for translation to the frequency band of interest. The serial interface may use electrical, optical, or other media.

In some embodiments of the invention, a single radio frequency processing unit may be capable of receiving radio signals on a plurality of radio frequency bands or sub-bands at the same time, and it may be capable of transmitting the intermediate frequency signals for a plurality of bands or sub-bands through a single digital data link to the intermediate frequency processing module at the same time, provided that the total bandwidth of these intermediate frequency signals is no larger than the bandwidth provided by the digital data link.

FIG. 2 shows the use of separate IF buses for each antenna used. However, by using a common digital interface it is possible to connect multiple antennas to the same baseband processing circuitry, allowing the processing of different radio standards in the same physical equipment. Standardisation of the interface therefore allows use of a common baseband processor module, simplifying system scalability and redundancy.

Although FIG. 2 shows dedicated "point to point" links between the RF and baseband circuitry, this does not preclude the use of network switches and multiplexers to manage system operation (fail-over, load balancing, etc.) or to combine multiple data streams for ease of transmission. In addition system control information (e.g. for tuning, power control, calibration, etc.) may also be multiplexed onto the interface for control of the remote RF circuitry.

Figure 3:
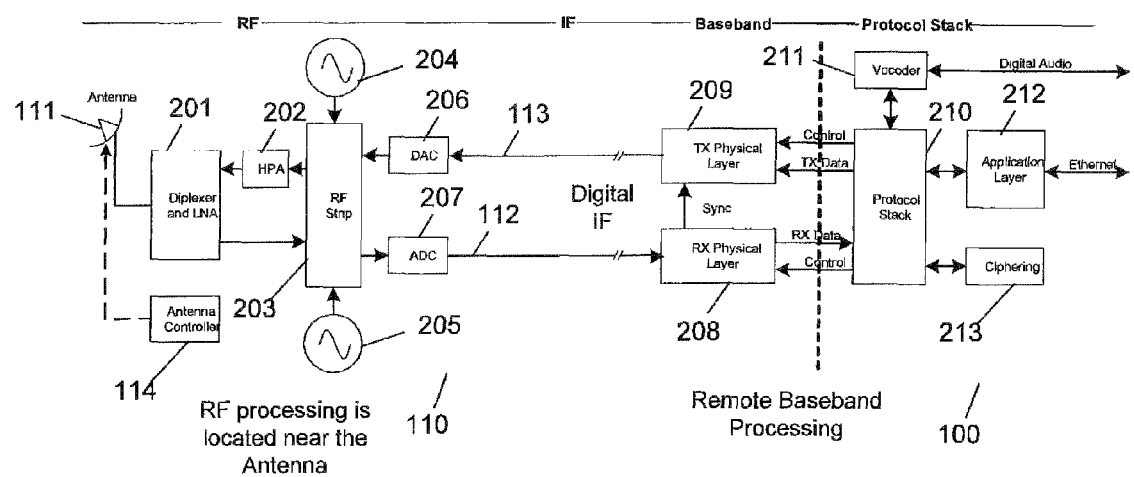
FIG. 3 is a block diagram showing a more detailed physical architecture of a radio installation according to an embodiment of the invention.

FIG. 3 is a block diagram showing the architecture of a radio system that implements a single radio standard. The location of the digital IF interface is identified between the transmit and receive "physical layers" and the associated data converters.

The left hand side of FIG. 3 shows a radio avionics box 110, connected to an antenna 111. The antenna 111 is provided with an antenna controller 114, which may be used, for example, to control physical parameters of the antenna, such as its orientation, alignment, etc. The radio avionics box 110 has a number of components. A Diplexer and LNA (low noise amplifier) module of the radio avionics box 110 connects to the antenna 111. The diplexer implements frequency domain multiplexing, allowing two different devices to share a common communications channel.

Signals from the Diplexer and LNA unit 201 may be passed on to the RF strip 203, where the RF is mixed down to an intermediate frequency. The oscillators 204 and 205 are used to generate signals for mixing to produce the intermediate frequencies. One of the two oscillators is used for each of two different RF standards.

The RF strip 203 can also generate RF signals to be transmitted, from a received intermediate frequency signal. These generated RF signals are then sent to an HPA (High Power Amplifier) unit 202 before being passed to the Diplexer and LNA unit.

The RF strip 203 may send intermediate frequency data to an analogue to digital converter (ADC) 207, in order to digitise the data, which is then sent over the digital data link 112 to the intermediate frequency processing unit 100. Intermediate frequency signals may also be sent from the intermediate frequency processing unit 100 over the digital data link 113, to a digital to analogue converter (DAC) 206, to generate an analogue intermediate frequency signal which is passed to the RF strip 203 for generating an RF signal. Although the digital data links 112, 113 are shown here as two separate unidirectional links, in some embodiments, a bidirectional link may be provided.

The intermediate signal processing module comprises baseband processing circuitry, which receives and sends intermediate frequency signals to the digital data link, and a protocol stack, which processes the signal according to the particular signal protocol that has been used.

The baseband processing circuitry includes a RX Physical layer 208, and a TX physical layer 209. A synchronisation signal is provided from the Rx physical layer 208 to the TX physical layer 209. Control data, received data and data to be sent are passed between the protocol stack 210 and the TX physical layer 209 or RX physical layer 208. The protocol stack processes the data to extract the necessary information, and deals with this according to the data type and pre-configured settings. For example, digital audio data may be sent to a Vocoder unit 211, to generate an audio signal. Application data may be processed by an application layer 212, and sent over an ethernet link to an appropriate application available on the network. A ciphering module 213 may be provided to deal with data decryption.

Figure 4:
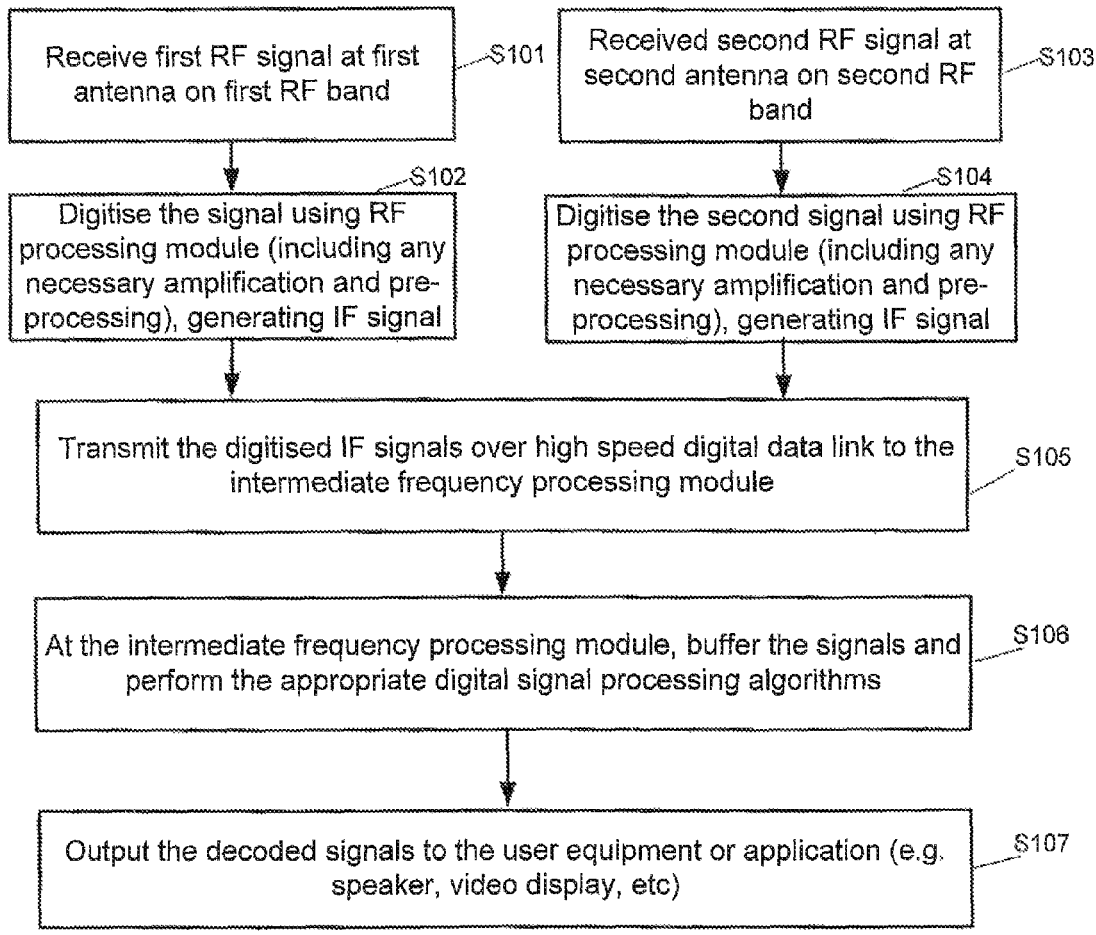
FIG. 4 is a flow chart, showing a method of receiving radio signals according to an embodiment of the invention.
Figure 5:
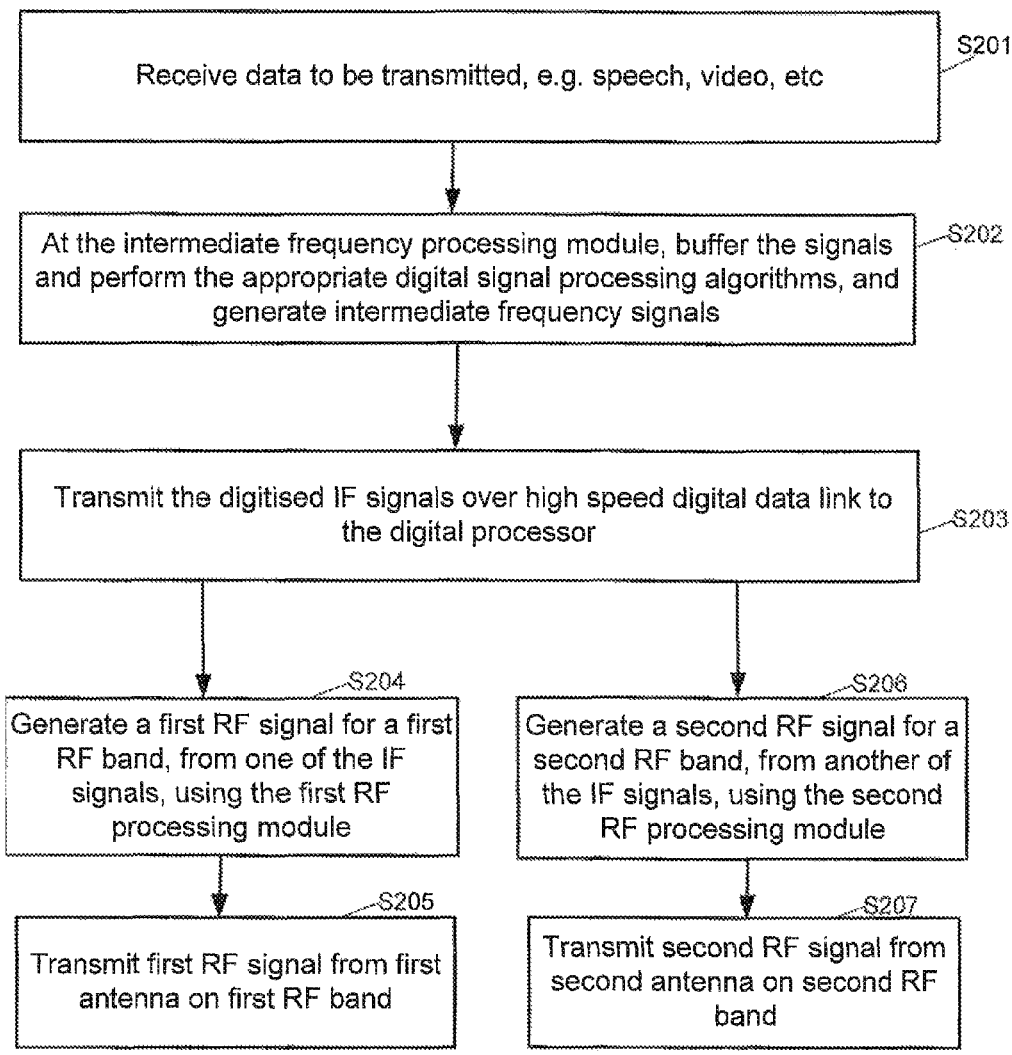
FIG. 5 is a flow chart, showing a method of transmitting radio signals according to an embodiment of the invention.

FIGS. 4 and 5 are flowcharts showing a method of receiving data and a method of transmitting data respectively, according to an embodiment of the invention. These methods relate to an example such as that of FIG. 2, in which two radio frequency processing modules are provided, each with its own antenna, and each radio frequency processing module may have a separate link, or a shared link, to an intermediate frequency processing module.

In FIG. 4, a first radio frequency signal on a first radio frequency band or sub-band is received at a first antenna at step S101. Next, at step S102, the received radio frequency signal is converted to an intermediate frequency signal and digitised. This includes any necessary amplification of the signal, and any preprocessing, such as filtering, etc.

At the same time, a second radio frequency signal on a second radio frequency band or sub-band is received at a second antenna at step S103. Next, at step S104, the received second radio frequency signal is converted to an intermediate frequency signal and digitised. This includes any necessary amplification of the signal, and any preprocessing, such as filtering, etc.

The two intermediate frequency signals are then transmitted over a high speed digital link at step S105, to a common intermediate frequency processing unit. The two signals may be transmitted over a single link, if the bandwidth is sufficient, or they may be transmitted over two separate links to the common intermediate frequency processing unit. At step S106, at the intermediate frequency processing unit, the signals are buffered, and the appropriate signal processing algorithms are performed. At step S107, information extracted from the intermediate frequency signals is sent to the appropriate user equipment or application, e.g. to a speaker (for audio signals), a computer screen (for video signals), or to another application which may be available on the same computing device, or on another computing device, via a wired or wireless network, for example, ethernet. For example, a tracking application may receive GPS signals and store them, in addition to or instead of outputting graphical information to a display.

FIG. 5 shows the data transmission process corresponding to FIG. 4. At step S201, data is received by a common intermediate frequency processing, from an application or from user equipment, e.g. speech data, video data, current position data, etc. At step S202, the intermediate frequency processing unit buffers the signals and performs the appropriate signal processing algorithms to generate intermediate frequency signals. At step S203, the digitised intermediate frequency signals are transmitted over a high speed digital data link to either a first RF processing unit, or a second RF processing unit, depending on which radio frequency band or sub-band is to be used. Intermediate frequency signals may be transmitted simultaneously to the first RF processing unit and the second RF processing unit, either by using separate digital data links, or by sharing a single link, provided that the total bandwidth is within the capacity of the link.

At step S204, the first radio frequency processing unit generates a first RF signal for the first RF band or sub-band, from a received intermediate frequency signal. Then, at step S205, this first RF signal is transmitted from an antenna on the first band or sub-band.

At the same time, at step S206, the second radio frequency processing unit generates a second RF signal for the second RF band or sub-band, from a received intermediate frequency signal. Then, at step S207, this second RF signal is transmitted from an antenna on the second band or sub-band.

These flowcharts show only particular examples of a method according to the invention, and modifications may be made to the methods and the apparatus, within the scope of the invention as defined by the claims.

The present invention can be implemented in dedicated hardware, using a programmable digital controller suitably programmed, or using a combination of hardware and software.

The intermediate frequency processing unit can be implemented by software or programmable computing apparatus. The code for each process in the methods according to the invention may be modular, or may be arranged in an alternative way to perform the same function.

Thus the present invention encompasses a carrier medium carrying machine readable instructions or computer code for controlling a programmable controller, computer or number of computers as the apparatus of the invention. The carrier medium can comprise any storage medium such as a floppy disk, CD ROM, DVD ROM, hard disk, magnetic tape, or programmable memory device, or a transient medium such as an electrical, optical, microwave, RF, electromagnetic, magnetic or acoustical signal. An example of such a signal is an encoded signal carrying a computer code over a communications network, e.g. a TCP/IP signal carrying computer code over an IP network such as the Internet, an intranet, or a local area network.

Further embodiments of the invention may be used in any situation where radio transmitters and receivers are required. For example, they may be used in mobile telephones, mobile radio transceivers (e.g. for use by emergency services, armed forces, etc), or as radio apparatus on other modes of transport such as cars, buses, taxis, trucks, trains, boats, aeroplanes, helicopters, or any type of military vehicle, e.g. tanks, armoured cars, etc. They may also be used for fixed or ground-based radio stations, for example, air traffic control applications, radio communications base stations, etc.

While the invention has been described in terms of what are at present its preferred embodiments, it will be apparent to those skilled in the art that various changes can be made to the preferred embodiments without departing from the scope of the invention, which is defined by the claims.

The invention claimed is:

1. An aircraft radio installation apparatus for processing data in an aircraft, the aircraft radio installation apparatus comprising:
   a. at least two radio frequency processing modules, the at least two radio frequency modules including:
      a first radio frequency processing module for converting radio frequency signals received according to a first radio communication protocol from a first antenna to intermediate frequency signals, and
      a second radio frequency processing module for converting radio frequency signals received according to a second radio communication protocol from a second antenna to intermediate frequency signals;
      each of the at least two radio frequency processing modules being provided in a radio avionics box;
   b. a baseband avionics box disposed remotely from the at least two radio frequency processing modules, the baseband avionics box having an intermediate frequency processing module, the intermediate frequency processing module being a common processing module for processing a plurality of intermediate frequency signals according to a plurality of different radio communication protocols, the intermediate frequency processing module provided for:
      i. receiving the intermediate frequency signals from the first and second radio frequency processing modules at the same time, and
      ii. processing the intermediate frequency signals from the first and second radio frequency processing modules according to the first and second radio communications protocols, respectively; and
   c. at least one digital data link for connecting the first and second radio frequency processing modules to the intermediate frequency processing module for transmitting the intermediate frequency signals to the intermediate frequency processing module.

2. An aircraft radio installation apparatus for processing data in an aircraft, the aircraft radio installation apparatus comprising:
   a. at least two radio frequency processing modules, the at least two radio frequency processing modules including:
      a first radio frequency processing module disposed at a first location, and a second radio frequency processing module disposed at a second location,
      the first radio frequency processing module for converting a plurality of radio frequency signals received from one or more antennas according to a first radio communication protocol, to a plurality of intermediate frequency signals, and
      the second radio frequency processing module for converting a plurality of radio frequency signals received from one or more antennas according to a second radio communication protocol, to a plurality of intermediate frequency signals,
      each of the at least two radio frequency processing modules being provided in a radio avionics box;
   b. a baseband avionics box having an intermediate frequency processing module disposed at a third location, the intermediate frequency processing module being a common processing module for processing intermediate frequency signals according to a plurality of different radio communication protocols, the intermediate frequency processing module provided for:
      i. receiving the plurality of intermediate frequency signals from the first and second radio frequency processing modules at the same time, and
      ii. processing the plurality of intermediate frequency signals from the first and second radio frequency processing modules according to the first and second radio communications protocols, respectively;
   c. a first digital data link for connecting the first radio frequency processing module disposed at the first location and the intermediate frequency processing module disposed at the third location, for transmitting the plurality of intermediate frequency signals to the intermediate frequency processing module; and
   d. a second digital data link for connecting the second radio frequency processing module disposed at the second location with the intermediate frequency processing module disposed at the third location, for transmitting the plurality of intermediate frequency signals to the intermediate frequency processing module.

3. An aircraft radio installation apparatus comprising:
   a baseband avionics box having an intermediate frequency processing module, the intermediate frequency processing module being a common processing module for generating a plurality of intermediate frequency signals according to a plurality of radio communications protocols for transmitting at the same time to at least two radio frequency processing modules located remotely from the baseband avionics box;
   the at least two radio frequency modules comprising, a first radio frequency processing module and a second radio frequency processing module,
      wherein, the first radio frequency processing module is provided for receiving intermediate frequency signals generated according to a first radio communication protocol from the intermediate frequency processing module, converting said received intermediate frequency signals to radio frequency signals according to the first radio communication protocol, and sending the radio frequency signals to one or more antennas, and wherein, the second radio frequency processing module is provided for receiving intermediate frequency signals generated according to a second radio communication protocol from the intermediate frequency processing module, converting said received intermediate frequency signals to radio frequency signals according to the second radio communication protocol, and sending the radio frequency signals to the one or more antennas, each of the at least two radio frequency processing modules being provided in a radio avionics box; and at least one digital data link for connecting the first radio frequency processing module, and the second radio frequency processing module to the intermediate frequency processing module, for transmitting the intermediate frequency signals generated according to the first and second radio communications protocols to the first and second radio frequency processing modules, respectively.

4. An aircraft radio installation apparatus comprising:

a. a baseband avionics box disposed at a third location and having an intermediate frequency processing module, the intermediate frequency processing module being a common processing module for generating a plurality of intermediate frequency signals according to a plurality of radio communications protocols for transmitting at the same time to at least two radio frequency processing modules;

b. the at least two radio frequency processing modules comprising, a first radio frequency processing module disposed at a first location and a second radio frequency processing module disposed at a second location;

wherein, the first radio frequency processing module is provided for receiving intermediate frequency signals generated according to a first radio communication protocol from the intermediate frequency processing module, converting said received intermediate frequency signals to a plurality of radio frequency signals according to the first radio communication protocol, and sending the plurality of radio frequency signals to one or more antennas, and wherein, the second radio frequency processing module is provided for receiving intermediate frequency signals generated according to a second radio communication protocol from the intermediate frequency processing module, converting said received intermediate frequency signals to a plurality of radio frequency signals according to the second radio communication protocol, and sending the plurality of radio frequency signals to the one or more antennas, each of the at least two radio frequency processing modules being provided in a radio avionics box;

c. a first digital data link for connecting the first radio frequency processing module disposed at the first location and the intermediate frequency processing module disposed at the third location, for transmitting the intermediate frequency signals to the first radio frequency processing module; and d. a second digital data link for connecting the second radio frequency processing module disposed at the second location and the intermediate frequency processing module disposed at the third location, for transmitting the intermediate frequency signals to the second radio frequency processing module.

5. The aircraft radio installation apparatus of claim 2, or 4, wherein the first and second digital data links are high speed serial links.

6. The aircraft radio installation apparatus of claim 2 or 4, wherein the first and second digital data links are configured to carry data having a bandwidth of at least 65 MHz.

7. The aircraft radio installation apparatus of claim 1 or 3, wherein the intermediate frequency processing module is configured to receive the plurality of intermediate frequency signals corresponding to a plurality of different radio frequency bands at the same time over the at least one digital data link from the first and second radio frequency processing modules.

8. The aircraft radio installation apparatus of claim 1 or 3, wherein the at least one digital data link comprises at least one of an electrical data link, an optical data link and a wireless data link.

9. The aircraft radio installation apparatus of claim 3, wherein the intermediate frequency processing module and the first and second radio frequency processing modules are configured for sending and receiving control information via the at least one digital data link, the control information comprising at least one of tuning, power control and calibration information.

10. The aircraft radio installation apparatus of claim 1 or 3, wherein the intermediate frequency processing module is configured to transmit the plurality of intermediate frequency signals corresponding to a plurality of different radio frequency bands at the same time over the at least one digital data link to the first and second radio frequency processing modules.

11. The aircraft radio installation apparatus of any of claims 1, 2, 3 and 4, wherein the distance between the radio avionics box and the baseband avionics box is in the range of 1-5 meters.

12. The aircraft radio installation apparatus of any of claims 1, 2, 3 and 4, wherein the distance between the radio avionics box and the baseband avionics box is less than 1 meter.

13. The aircraft radio installation apparatus of any of claims 1, 2, 3 and 4, wherein the distance between the radio avionics box and the baseband avionics box is over 5 meters.

14. The aircraft radio installation apparatus of any of claims 1, 2, 3 and 4, wherein the plurality of intermediate frequency signals are converted to baseband frequency signals.

15. The aircraft radio installation apparatus of claim 2 or 4, wherein the at least two radio processing modules include a third radio frequency processing module for converting or receiving intermediate frequency signals according to a third radio communication protocol, the third radio frequency processing module being connected to the intermediate frequency processing module using a third digital data link.

16. The aircraft radio installation apparatus of claim 2 or 4, wherein the intermediate frequency processing module and the first radio frequency processing module are configured to receive or send control information via the first digital data link, and the intermediate frequency processing module and the second radio frequency processing module are configured to send or receive control information via the second digital data link, the control information comprising at least one of tuning, power control and calibration information.

17. The aircraft radio installation apparatus according to claim 1 or 3, wherein the intermediate frequency processing module comprises:

baseband processing circuitry for receiving and sending the intermediate frequency signals to the at least one digital data link; and a protocol stack for processing the intermediate frequency signals according to a radio communication protocol that has been used on the intermediate frequency signals.

18. The aircraft radio installation apparatus according to claim 2 or 4, wherein the intermediate frequency module comprises:
baseband processing circuitry for receiving and sending the intermediate frequency signals to the first and second digital data links; and
a protocol stack for processing the intermediate frequency signals according to a radio communication protocol that has been used on the intermediate frequency signals.

19. The aircraft radio installation apparatus according to claim 17, wherein the baseband processing circuitry comprises:
a RX Physical layer and a TX Physical layer, Wherein the RX Physical layer is configured to send a synchronisation signal to the TX Physical layer; and
wherein control data, received data and data to be transmitted are passed between the protocol stack and the TX Physical layer or the RX Physical layer.

20. The aircraft radio installation apparatus according to claim 19 wherein the protocol stack is configured to process said data according to data type and pre-configured settings for the data, to extract necessary information.

21. The aircraft radio installation apparatus according to claim 18, wherein the baseband processing circuitry comprises:
a RX Physical layer and a TX Physical layer, wherein the RX Physical layer is configured to send a synchronisation signal to the TX Physical layer; and
wherein control data, received data and data to be transmitted are passed between the protocol stack and the TX Physical layer or the RX Physical layer.

22. The aircraft radio installation apparatus according to claim 21, wherein the protocol stack is configured to process said data according to data type and pre-configured settings for the data, to extract necessary information.

23. A radio communication method for an aircraft radio installation apparatus, the method comprising:
a. receiving a plurality of radio frequency signals from a plurality of antennas;
b. converting the plurality of radio frequency signals to a plurality of intermediate frequency signals by at least two radio frequency processing modules, the at least two radio frequency processing modules comprising a first radio frequency processing module and a second radio frequency processing module, the first radio frequency processing module for converting radio frequency signals received according to a first radio communication protocol to intermediate frequency signals, and the second radio frequency processing module for converting radio frequency signals received according to a second radio communication protocol to intermediate frequency signals, each of the at least two radio frequency processing modules being provided in a radio avionics box;
c. transmitting the intermediate frequency signals from the first radio frequency processing module to a baseband avionics box, and at the same time transmitting the intermediate frequency signals from the second radio frequency processing module to the baseband avionics box, the baseband avionics box located remotely from the at least two radio frequency processing modules and having an intermediate frequency processing module, the intermediate frequency processing module being a common processing module for processing intermediate frequency signals according to a plurality of different radio communications protocols, the intermediate frequency signals being transmitted from the first and second radio frequency processing modules via at least one digital data link; and
d. processing the intermediate frequency signals from the first and second radio frequency processing modules according to the first and second radio communications protocols, respectively, at the intermediate frequency processing module.

24. A radio communication method for an aircraft radio installation apparatus, the method comprising:
a. receiving a plurality of radio frequency signals from a plurality of antennas;
b. converting the plurality of radio frequency signals to a plurality of intermediate frequency signals by at least two radio frequency processing modules, the at least two radio frequency processing modules comprising a first radio frequency processing module at a first location and a second radio frequency processing module at a second location, the first radio frequency processing module for converting radio frequency signals received according to a first radio communication protocol to intermediate frequency signals, and the second radio frequency processing module for converting radio frequency signals received according to a second radio communication protocol to intermediate frequency signals, each of the at least two radio frequency processing modules being provided in a radio avionics box;
c. transmitting the intermediate frequency signals from the first radio frequency processing module to a baseband avionics box at a third location via a first digital data link, the third location being separated from the location of the first and second radio frequency processing modules, and at the same time transmitting the intermediate frequency signals from the second radio frequency processing module to the baseband avionics box via a second digital data link, the baseband avionics box having an intermediate frequency processing module, the intermediate frequency processing module being a common processing module for processing intermediate frequency signals according to a plurality of different radio communications protocols; and
d. processing the intermediate frequency signals from the first and second radio frequency processing modules according to the first and second radio communications protocols, respectively at the intermediate frequency processing module.

25. A radio communication method for an aircraft radio installation apparatus, the method comprising:
a. generating a plurality of intermediate frequency signals according to a plurality of radio communications protocols at an intermediate frequency processing module, the intermediate frequency processing module being provided in a baseband avionics box, the intermediate frequency processing module being a common processing module for generating intermediate frequency signals according to a plurality of radio communications protocols for at least two radio frequency processing modules that are located remotely from the baseband avionics box; the at least two radio frequency processing modules comprising, a first radio frequency processing module and a second radio frequency processing module;
b. transmitting intermediate frequency signals generated according to a first radio communication protocol to the first radio frequency processing module, and at the same time, transmitting intermediate frequency signals generated according to a second radio communication protocol to the second radio frequency module; said intermediate frequency signals being transmitted to the first and second radio frequency processing modules via at least one digital data link;

c. at the first radio frequency processing module, converting received intermediate frequency signals to radio frequency signals according to the first radio communication protocol, and sending the radio frequency signals according to the first radio communication protocol to one or more antennas; and d. at the second radio frequency module, converting received intermediate frequency signals to radio frequency signals according to the second radio communication protocol, and sending the radio frequency signals according to the second radio communication protocol to the one or more antennas.

26. A radio communication method for a radio installation apparatus on an aircraft, the method comprising:

a. generating a plurality of intermediate frequency signals according to a plurality of radio communications protocols at an intermediate frequency processing module at a third location, the intermediate frequency processing module being provided in a baseband avionics box, the intermediate frequency processing module being a common processing module for generating the plurality of intermediate frequency signals according to the plurality of radio communications protocols for at least two radio frequency processing modules; the at least two radio frequency processing modules comprising, a first radio frequency processing module at a first location and a second radio frequency processing module at a second location, said first and second locations being separated from the third location;

b. transmitting intermediate frequency signals generated according to a first radio communication protocol to the first radio frequency processing module via a first digital data link, and at the same time, transmitting intermediate frequency signals generated according to a second radio communication protocol to the second radio frequency processing module via a second digital data link;

c. at the first radio frequency module, converting received intermediate frequency signals to radio frequency signals according to the first radio communication protocol, and sending the radio frequency signals according to the first radio communication protocol to one or more antennas, and d. at the second radio frequency module, converting received intermediate frequency signals to radio frequency signals according to the second radio communication protocol, and sending the radio frequency signals according to the second radio communication protocol to the one or more antennas.

27. The method of claim 24 or 26, wherein the first digital data link or the second digital data link is a high speed serial link.

28. The method of claim 24 or 26, wherein the first digital data link or the second digital data link is configured to carry data having a bandwidth of at least 65 MHz.

29. The method of claim 23 or 25, further comprising transmitting the plurality of intermediate frequency signals corresponding to a plurality of different radio frequency bands at the same time over the at least one digital data link.

30. The method of claim 24 or 26, wherein the first digital data link or the second digital data link comprises at least one of:

a. an electrical data link;
b. an optical data link; and
c. a wireless data link.

31. The method of claim 24 or 26, wherein the at least two radio frequency processing modules includes a third radio frequency processing module, the method further comprising transmitting intermediate frequency signals according to a third radio communication protocol to or from the third radio frequency processing module connected to the intermediate frequency processing module via a third digital data link.

\* \* \* \* \*